(12) United States Patent
Namba et al.

(10) Patent No.: US 7,291,989 B2
(45) Date of Patent: Nov. 6, 2007

(54) LIGHTING CONTROL CIRCUIT FOR VEHICLE LIGHTING EQUIPMENT

(75) Inventors: Takanori Namba, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 143 days.

(21) Appl. No.: 11/296,050

(22) Filed: Dec. 6, 2005

(65) Prior Publication Data

US 2006/0119181 A1 Jun. 8, 2006

(30) Foreign Application Priority Data

Dec. 7, 2004 (JP) .................... P. 2004-354005

(51) Int. Cl.
*H05B 37/02* (2006.01)
(52) U.S. Cl. .................... 315/291; 315/224; 307/10.8
(58) Field of Classification Search ................ 315/291, 315/224; 307/10.8
See application file for complete search history.

(56) References Cited

U.S. PATENT DOCUMENTS

| | | | | |
|---|---|---|---|---|
| 4,973,896 A | * | 11/1990 | Shiga et al. ................ 322/28 |
| 5,583,751 A | * | 12/1996 | Nakazawa et al. ............ 363/20 |
| 2005/0218838 A1 | * | 10/2005 | Lys ............................ 315/291 |
| 2006/0055244 A1 | * | 3/2006 | Ito et al. ..................... 307/10.8 |
| 2006/0132061 A1 | * | 6/2006 | McCormick et al. ........ 315/291 |

FOREIGN PATENT DOCUMENTS

JP 2004-134147 4/2004

* cited by examiner

*Primary Examiner*—Douglas W. Owens
*Assistant Examiner*—Chuc Tran
(74) *Attorney, Agent, or Firm*—Fish & Richardson P.C.

(57) ABSTRACT

This disclosure relates to protecting a switching regulator by sensing immediately a change in an input voltage when the input voltage of the switching regulator is changed suddenly. When an input voltage of a switching regulator 12 is changed suddenly and an interrupt request signal IRQ is provided from an input voltage sensing circuit 16 while electromagnetic energy accumulated in the switching regulator 12 is discharged to an output block 14 by turning ON/OFF a switch SW1 in accordance with a switching signal generated by a microcomputer 18, to control a lighting of an LED1, the microcomputer 18 reduces an ON duty of the switching signal provided to the switch SW1 in response to the interrupt request signal IRQ and limits an increase of a peak value of a current flowing through a primary side of the switching regulator 12.

6 Claims, 9 Drawing Sheets

LIGHTING CONTROL CIRCUIT FOR VEHICLE LIGHTING EQUIPMENT

TECHNICAL FIELD

The present disclosure relates to a lighting control circuit for a vehicle lighting device and, more particularly, a lighting control circuit for a vehicle lighting device designed to control the lighting of a semiconductor light source composed of a semiconductor light emitting element.

BACKGROUND

For vehicle lighting devices, it is known to use a semiconductor light emitting element such as a LED (Light Emitting Diode), or the like, as a light source. The lighting control circuit for controlling the lighting of the LED is installed into the vehicle lighting device of this type.

In constructing the lighting control circuit, a switching regulator having a switching element and a transformer may be used. Then an input voltage fed from a DC power supply is accumulated in the transformer as electromagnetic energy during an ON-operation of the switching element. Also, electromagnetic energy accumulated in the transformer is supplied to the LED from the secondary side of the transformer via a rectifier diode and smoothing capacitor during an OFF-operation of the switching element (see JP-A-2004-134147 at pages 3 to 6; FIGS. 1 and 2)). In this lighting control circuit, operation of the switching regulator is stopped when failure of a power supply voltage is sensed. Also, operation of the switching regulator is restarted when such failure is no longer sensed.

A microcomputer has been used to generate a switching signal to control the ON/OFF-operation of the switching element. In controlling the switching element in the switching regulator by using the microcomputer, a countermeasure must be devised to prevent a situation in which the electronic parts, such as the switching element and the like, are destroyed as a result of an increase of the primary current of the switching regulator. The LED typically is electrically stable, and the impedance of the LED typically is not changed in a short time, in contrast to an electric-discharge lamp. When the LED or the like is assumed as the load, a variation on the output side of the switching regulator is small. Thus, only a sudden change of the input voltage (power-supply voltage) needs to be considered as the cause of the increase of the primary current. Therefore, attempts have been made to limit the current on the primary side of the switching regulator by monitoring the current flowing through the primary side each time the switching element is turned ON/OFF and then limiting the current on the primary side when the current on the primary side is abnormal.

To limit the current on the primary side of the switching regulator when the input voltage of the switching regulator is changed suddenly by monitoring the current flowing through the primary side each time the switching element is turned ON/OFF, a microcomputer having a response speed of several tens nanoseconds (ns) to several micro-seconds (μn) is needed to sense a change of the input voltage. Therefore, the microcomputer must be driven at 1 GHz, for example, which increases the cost of the lighting control circuit.

Also, in order to limit an increase of the current on the primary side of the switching regulator, a "duty max" (a maximum value of an ON duty) is provided to the switching signal, which is used to turn the switching element ON/OFF, and the ON duty is limited to a duty max when the input voltage is changed abruptly. In this event, if the microcomputer executes not only the process of sensing a sudden change of the input voltage, but also the process of computing the duty max, it takes much time to execute the process. In other words, after the input voltage is changed suddenly, it takes a relatively long time until an increase of the current on the primary side can be limited. Therefore, there is a possibility that the switching element cannot be protected promptly.

If the microcomputer is caused to take in the input voltage and execute either the process of sensing the sudden change of the input voltage or the process of limiting the current on the primary side, a lot of time is required to execute an arithmetic operation. Thus, it is possible that the lighting control circuit cannot respond to the sudden change of the input voltage.

Figure 14:
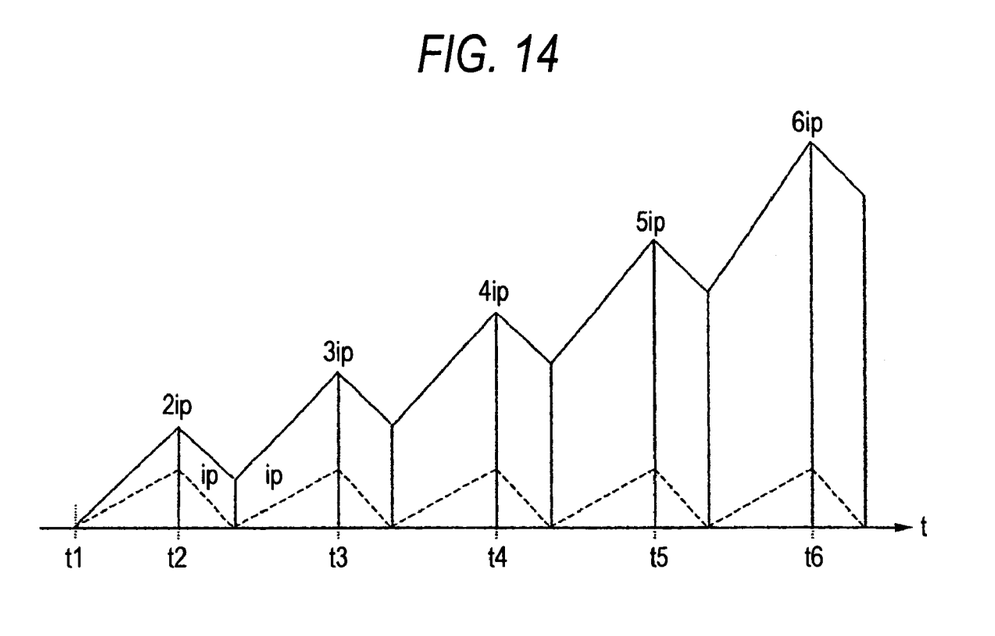
FIG. 14 is a waveform diagram explaining a condition when an input voltage of a switching regulator according to a known technique is changed suddenly.

In the event that the input voltage continues to change abruptly, for example if the input voltage is increased twice from 12 V to 24 V, as shown in FIG. 14, a peak value of the current on the primary side of the switching regulator is accumulated sequentially every time a pulse (switching signal) is generated to ON/OFF-operate the switching element. Suppose, for example, that a peak current on the primary side is defined as "ip" in the normal operation and the input voltage is abruptly changed twice at a time t1, the peak current on the primary side is increased as 2ip, 3ip, 4ip, 5ip, 6ip at times t2 to t6 every time the pulse is output. This is because a rising gradient of ip is doubled but a falling gradient is not changed. Also, since one pulse period is 10 μs when a PFW (PWM) frequency used to ON/OFF-operate the switching element is set to 100 kHz, ip is increased 11 times in a period of 100 μs (equivalent to 10 pulses). Therefore, when ip=5 A is set in the normal operation, ip=55 A is obtained after 100 μs. If the current flowing through the switching element cannot be limited until 100 μs has elapsed after the input voltage was changed suddenly, there is a possibility that the switching element will be destroyed.

Also, if the switching element is operated in a current boundary mode, the switching element is not turned ON unless the current on the secondary side of the switching regulator becomes 0. In this event, if about 100 μs passes until the ON duty of the switching element is set after the microcomputer sensed a current boundary, an increase in the current on the primary side of the transformer is caused subsequently to the sudden change of the input voltage before the switching element goes to the operation in the current boundary mode. Thus, it is possible that the switching element will be destroyed.

SUMMARY

The present invention has been made in light of the foregoing problems. The present invention relates to protecting a switching regulator by sensing immediately a change in an input voltage when the input voltage of the switching regulator is changed suddenly.

According to the present disclosure, a lighting control circuit for a vehicle lighting device includes a switching regulator for converting an input voltage from a power supply into an electromagnetic energy by an ON/OFF operation of a switching element connected to a transformer or a coil, and for discharging the electromagnetic energy. The circuit includes an energy propagating means for propagating the electromagnetic energy discharged from the switching regulator to a semiconductor light source as a luminous energy. A controlling means generates a switching signal based on an arithmetic process, and controls the ON/OFF operation of the switching element in accordance with the switching signal. An input voltage sensing means is provided for providing an input-voltage sudden-change sense signal to the controlling means when the input voltage sensing means senses that the input voltage of the switching regulator is outside a set voltage. The controlling means reduces an ON duty of the switching signal to be smaller than a preceding ON duty in response to the input-voltage sudden-change sense signal.

In operation, when the input voltage of the switching regulator is changed suddenly, and the input voltage is out of the set voltage while the electromagnetic energy generated from the switching regulator is supplied to the load as the luminous energy, the input-voltage sudden-change sense signal is provided to the controlling means from input voltage sensing means. Therefore, the controlling means does not execute a calculation to sense the sudden change of the input voltage, but executes a control operation to reduce the ON duty of the switching signal so that it is smaller than a preceding ON duty (i.e., an ON duty prior to the sudden change of the input voltage in response to the input-voltage sudden-change sense signal). As a result, an increase in the current (current on the primary side) flowing through the switching element can be limited immediately, and thus the switching regulator can be protected without fail.

Various features may be included in some implementations. For example, the input voltage sensing means may include a plurality of voltage-dividing means for voltage-dividing the input voltage of the switching regulator at different voltage-dividing ratios. A charge accumulating means may be provided for accumulating a charge while using a divided voltage derived by a voltage division of a main voltage-dividing means, which has a highest voltage-dividing ratio out of the plurality of voltage-dividing means, as a reference voltage that corresponds to the set voltage. A comparing means may be provided for comparing the divided voltage derived by a voltage division of an auxiliary voltage-dividing means (which is different from the main voltage-dividing means out of the plurality of voltage-dividing means), with the reference voltage, and then outputting the input-voltage sudden-change sense signal when the divided voltage derived by the voltage division of the auxiliary voltage-dividing means exceeds the reference voltage.

In operation, the reference voltage derived by the voltage division of the main voltage-dividing means out of a plurality of voltage-dividing means is set to a voltage that is higher than the divided voltage derived by the voltage division of the auxiliary voltage-dividing means. Even when the input voltage of the switching regulator is changed suddenly, this reference voltage is not changed suddenly, but is changed gradually based on a time constant because charges of the reference voltage are accumulated in the charge accumulating means (e.g., capacitor). In contrast, the divided voltage derived by the voltage division of the auxiliary voltage-dividing means is changed suddenly with the change of the input voltage and goes to a higher level than the reference voltage at a moment because the charges of the divided voltage are not accumulated in the charge accumulating means (e.g., capacitor). The input-voltage sudden-change sense signal is provided from the comparing means when the divided voltage exceeds the reference voltage. Therefore, the sudden change of the input voltage can be sensed immediately.

The input voltage sensing means also may include a plurality of voltage-dividing means for voltage-dividing the input voltage of the switching regulator at different voltage-dividing ratios. A charge accumulating means may be provided for accumulating a charge while using a divided voltage (derived by a voltage division of a main voltage-dividing means, which has a highest-voltage-dividing ratio out of the plurality of voltage-dividing means) as a reference voltage that corresponds to the set voltage. A plurality of comparing means may be provided for comparing divided voltages (derived by a voltage division of a plurality of auxiliary voltage-dividing means, which are different from the main voltage-dividing means out of the plurality of voltage-dividing means) with the reference voltage respectively, and then outputting the input-voltage sudden-change sense signal when the divided voltages derived by the voltage division of respective auxiliary voltage-dividing means exceeds the reference voltage.

In operation, the reference voltage derived by the voltage division of the main voltage-dividing means out of a plurality of voltage-dividing means is set to a voltage that is higher than the divided voltages derived by the voltage division of respective auxiliary voltage-dividing means. Even when the input voltage of the switching regulator is changed suddenly, this reference voltage is not changed suddenly, but instead is changed gradually based on a time constant because the charges of the reference voltage are accumulated in the charge accumulating means (e.g., capacitor). In contrast, the divided voltage derived by the voltage division of the auxiliary voltage-dividing means is changed suddenly with the change of the input voltage and goes to a higher level than the reference voltage at once because the charges of the divided voltage are not accumulated in the charge accumulating means (e.g., capacitor). Then, the input-voltage sudden-change sense signals are provided from respective comparing means when the divided voltages derived by the voltage division of respective auxiliary voltage-dividing means exceed the reference voltage, and therefore the sudden change of the input voltage can be sensed immediately. In this case, as a plurality of input-voltage sudden-change sense signals are provided sequentially, the sudden change of the input voltage can be sensed immediately without fail even when any comparing means is abnormal, and therefore the switching regulator can be better protected.

The controlling means may be implemented by a microcomputer that executes an arithmetic process in accordance with a program to generate the switching signal. The microcomputer may have an external interrupt terminal as an external signal input terminal and may execute a process of reducing an ON duty of the switching signal as an external interrupting process when the input-voltage sudden-change sense signal is provided to the external interrupt terminal.

In operation, when employed as the controlling means, the microcomputer executes a process of reducing the ON duty of the switching signal as the external interrupt process when the input-voltage sudden-change sense signal is provided to the external interrupt terminal. Therefore, sensing that the input voltage of the switching regulator is changed suddenly is not required of the microcomputer. Thus the microcomputer can immediately proceed to limit an increase of the current of the switching element. As a result, the switching regulator can be better protected even when the microcomputer is employed.

The microcomputer may have a plurality of external interrupt terminals as external signal input terminals and may execute a process of reducing sequentially an ON duty of the switching signal as an external interrupting process each time when the input-voltage sudden-change sense signal is provided to respective external interrupt terminals.

In operation, when employed as the controlling means the microcomputer executes a process of reducing sequentially the ON duty of the switching signal as the external interrupt process each time when the input-voltage sudden-change sense signal is provided to respective external interrupt terminals. Therefore, sensing that the input voltage of the switching regulator is changed suddenly is not required of the microcomputer. Thus, the microcomputer can immediately proceed to limit an increase of the current of the switching element. Therefore, the switching regulator can be better protected even when the microcomputer is employed. In addition, the ON duty of the switching signal is reduced sequentially in response to the input-voltage sudden-change sense signal that is produced to meet a level of the change in the input voltage of the switching regulator. As a result, the ON duty is reduced to be smaller than that being set before the input voltage is changed suddenly when a change of the input voltage is small, whereas the ON duty is reduced to be even smaller than that being set when the change of the input voltage is small when a change of the input voltage is large. Therefore an increase of the current of the switching element can be limited finely and smoothly.

Various advantages may be present in some implementations. For example, as already discussed, the switching regulator can be better protected.

In addition, a sudden change of the input voltage can be sensed immediately.

Furthermore, a sudden change of the input voltage can be sensed immediately and without fail and, thus, the switching regulator can be better protected.

As explained above, even when the microcomputer is used, the switching regulator can be better protected.

Also, even when the microcomputer is used, an increase in the current of the switching element can be limited smoothly.

Other features and advantages may be apparent from the following detailed description, the accompanying drawings and the claims.

DETAILED DESCRIPTION OF BEST MODE(S) FOR CARRYING OUT THE INVENTION

Next, embodiments of the present invention will be explained with reference to examples hereinafter.

In the Figures, a lighting control circuit 10 for a vehicle lighting device has a switching regulator 12, an output block 14, an input voltage sensing circuit 16, and a microcomputer (referred to as a "micro" hereinafter) 18. The vehicle lighting device (light emitting equipment) includes a semiconductor light emitting element LED1 that serves as a semiconductor light source.

In this case, either two or more series-connected light emitting diodes (LEDs), or plural parallel-connected light source blocks each of which includes multiple series-connected LEDs, may be employed in place of the LED1. Also, each semiconductor light source can be constructed as a light source for various vehicle lighting devices such as a head lamp, a stop & tail lamp, a fog lamp, a turn signal lamp, and the like.

Figure 1:
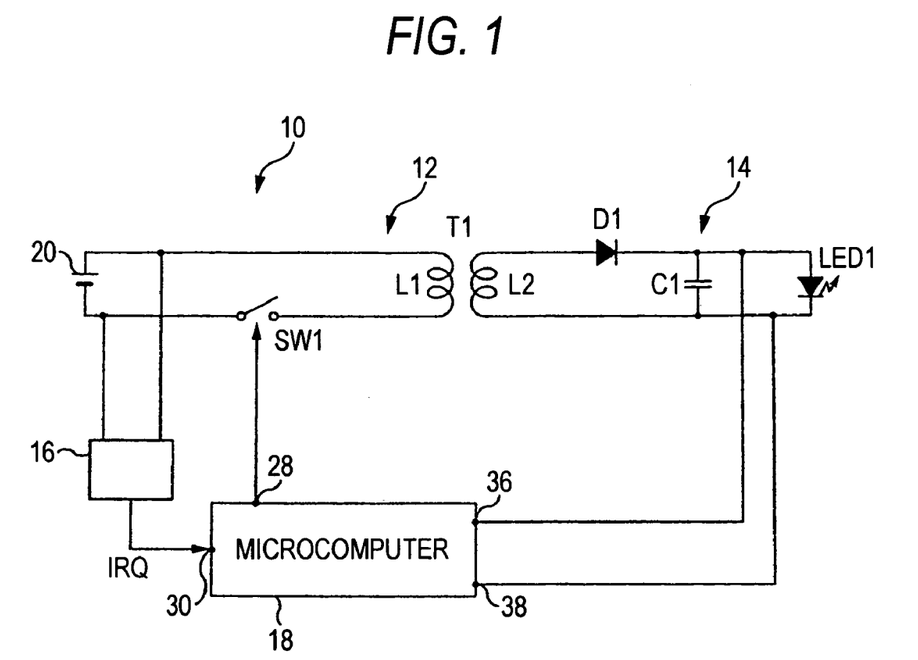
FIG. 1 is a circuit configuration view of a lighting control circuit for a vehicle lighting device showing an embodiment of the present invention.

The switching regulator 12 has a switch (switching element) SW1 and a transformer T1. One end side of a primary winding L1 of the transformer T1 is connected to a positive terminal of an onboard battery (DC power supply) 20, and the other end side thereof is connected to a negative terminal of the onboard battery 20 via the switch SW1. Both end sides of a secondary winding L2 are connected to the output block 14, respectively. The switch SW1 is ON/OFF-operated in response to a switching signal (positive signal) from the micro 18. The transformer T1 accumulates an input voltage from the onboard battery 20 in the primary winding L1 as electromagnetic energy during the ON operation of the switch SW1, and discharges the electromagnetic energy accumulated in the primary winding L2 from the secondary side to the output block 14 during the OFF operation of the switch SW1.

Figure 2:
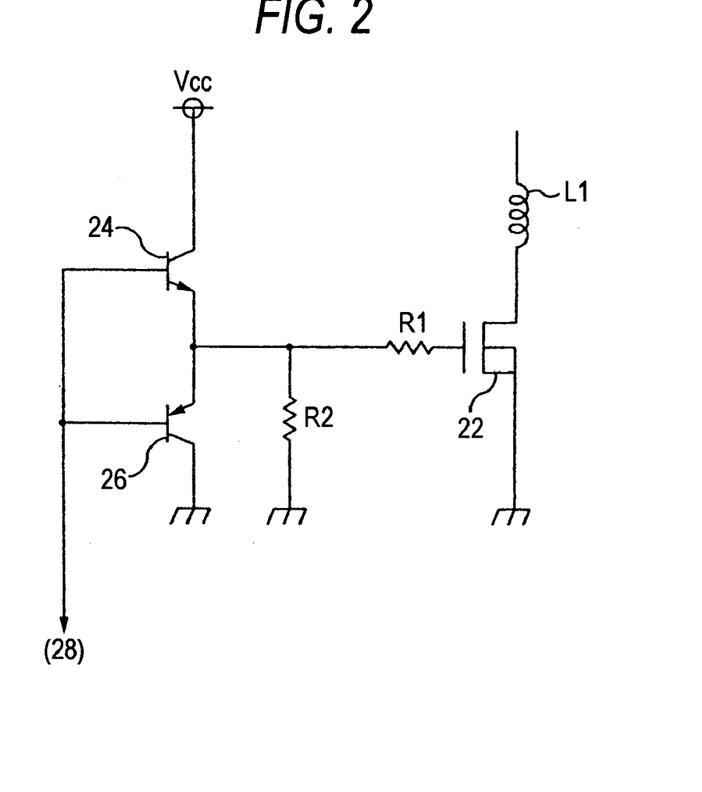
FIG. 2 is a circuit configuration of a switching element and its driving circuit.

As shown in FIG. 2, for example, the switch SW1 may comprise an NMOS transistor 22 acting as a switching element. Resistors R1, R2, an NPN transistor 24, and a PNP transistor 26 are provided for driving the NMOS transistor 22. A drain of the NMOS transistor 22 is connected to the primary winding L1 of the transformer T1, and a source thereof is connected to ground. Bases of the NPN transistor 24 and the PNP transistor 26 are connected to an output terminal 28 of the micro 18, respectively, and serve as a buffer circuit. When a high-level switching signal is provided from the micro 18, the NPN transistor 24 and the NMOS transistor 22 are turned ON, whereby the electromagnetic energy is accumulated in the primary winding L1. In contrast, when a low-level switching signal is provided from the micro 18, the PNP transistor 26 is turned ON and the NMOS transistor 22 is turned OFF. Thus, the electromagnetic energy accumulated in the primary winding L1 is discharged from the secondary side of the transformer T1.

The output block 14 is connected across the LED1 acting as the load. The output block 14 serves as an energy propagating means for rectifying the electromagnetic energy discharged from the secondary side of the transformer T1 and propagating the energy to the LED1 as a luminous energy. The output block 14 has a diode D1 as a rectifying element for rectifying a current being output from the secondary side of the transformer T1, and a capacitor C1 for smoothing an output current of the diode D1.

The input voltage sensing circuit 16 is constructed as an input voltage sensing means. When this input voltage sensing means senses that the input voltage (power supply voltage) being input into the switching regulator 12 is out of a set voltage (set value), the means provides an input-voltage sudden-change sense signal to an external interrupt terminal 30 of the micro 18 as an interrupt request signal IRQ.

Figure 3:
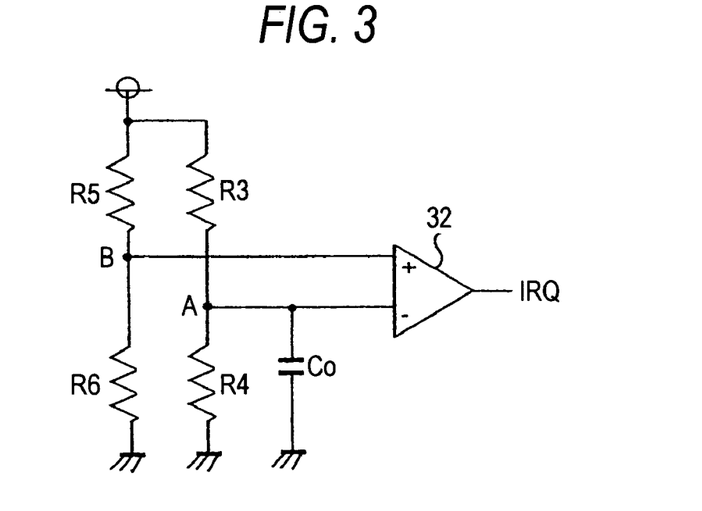
FIG. 3 is a circuit configuration of an input voltage sensing circuit.

As shown in FIG. 3, for example, the input voltage sensing circuit 16 has resistors R3, R4, R5, R6, a capacitor Co, and a comparator 32. The resistors R3, R4 and the resistors R5, R6 form a plurality of voltage-dividing means that divide the input voltage of the switching regulator 12 at different voltage-dividing ratios. The resistors R3, R4 divide the input voltage of the switching regulator 12 as a main voltage-dividing means having the highest voltage-dividing ratio, and provides a divided voltage obtained by this voltage division (divided voltage at a voltage-dividing point A) to a negative input terminal of the comparator 32 as a reference voltage. This reference voltage corresponds to a set voltage that is set to sense a sudden change of the input voltage.

In contrast, the resistors R5, R6 divide the input voltage of the switching regulator 12 as an auxiliary voltage-dividing means having a voltage-dividing ratio lower than the resistors R3, R4, and provides a divided voltage obtained by this voltage division (divided voltage at a voltage-dividing point B) to a positive input terminal of the comparator 32. In this case, the reference voltage in the normal operation is set higher than the divided voltage at the voltage-dividing point B. Also, the capacitor Co acting as a charge accumulating means that accumulates charges of the reference voltage at the voltage-dividing point A is connected to the voltage-dividing point A. The comparator 32 serves as a comparing means. This comparator 32 compares the divided voltage applied to the positive input terminal (divided voltage at the voltage-dividing point B) with the reference voltage applied to the negative input terminal, and then outputs a high-level signal (input-voltage sudden-change sense signal) as the interrupt request signal IRQ when the divided voltage at the voltage-dividing point B exceeds the reference voltage.

Figure 4:
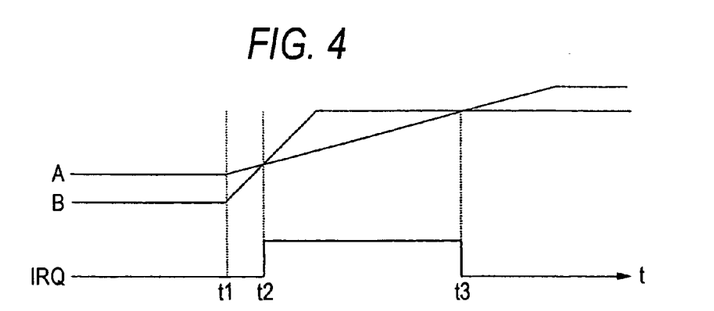
FIG. 4 is a waveform diagram explaining an operation of the input voltage sensing circuit.

As shown in FIG. 4, the reference voltage at the voltage-dividing point A (divided voltage) is set to a voltage that is higher than the divided voltage at the voltage-dividing point B. The divided voltage at the voltage-dividing point B is changed suddenly the moment the input voltage of the switching regulator 12 is changed at a time t1, whereas, because the capacitor Co is connected to the voltage-dividing point A, the reference voltage at the voltage-dividing point A is increased gradually based on a time constant the moment the input voltage is changed. In other words, the input voltage sensing circuit 16 is constructed such that, when the input voltage is changed suddenly at a time t1, the divided voltage at the, voltage-dividing point B exceeds the reference voltage at the voltage-dividing point A at a time t2. Subsequently, the reference voltage at the voltage-dividing point A rises to a higher level than the divided voltage at the voltage-dividing point B at a time t3 after a predetermined time has elapsed. Thus, the interrupt request signal IRQ is provided from the comparator 32 at a time t2 immediately after the input voltage is changed suddenly at a time t1. Therefore, a sudden change of the input voltage of the switching regulator 12 can be sensed immediately.

The micro 18 serves as a controlling means. As shown in FIG. 1, for example, the micro 18 receives the voltage applied to LED1 or the current flowing through LED1 via input terminals 36, 38, then monitors a lighting state of LED1 according to such voltage or current, then generates the switching signal by executing various arithmetic processes based on this monitored result and a processing program. the micro then provides the generated switching signal to the switching regulator 12 from the output terminal 28, and controls the ON/OFF operation of the switch SW1, i.e., the NMOS transistor 22. When the interrupt request signal IRQ is provided to the external interrupt terminal 30 from the input voltage sensing circuit 16 as a result of the sudden change of the input voltage of the switching regulator 12 while the micro 18 controls the ON/OFF operation of the switch SW1 of the switching regulator 12 by generating the switching signal, the micro 18 executes a control, which causes the ON-duty of the switching signal to be reduced to a value smaller than that being set before the input voltage is changed suddenly (before the interrupt request signal IRQ is input), as an external interrupting process in response to the interrupt request signal IRQ. The ON-operation period of the NMOS transistor 22 can be shortened as soon as the ON-duty of the switching signal is reduced. Thus, an increase of the current flowing through the primary side of the switching regulator 12, i.e., the current flowing through the NMOS transistor 22 can be limited. In this case, the value of the ON-duty of the switching signal can be set to correlate with an allowable current to protect the NMOS transistor 22. Also, in reducing the ON-duty of the switching signal, the ON-duty of the switching signal can be set to 0 so as to turn OFF the NMOS transistor 22 completely.

Figure 5:
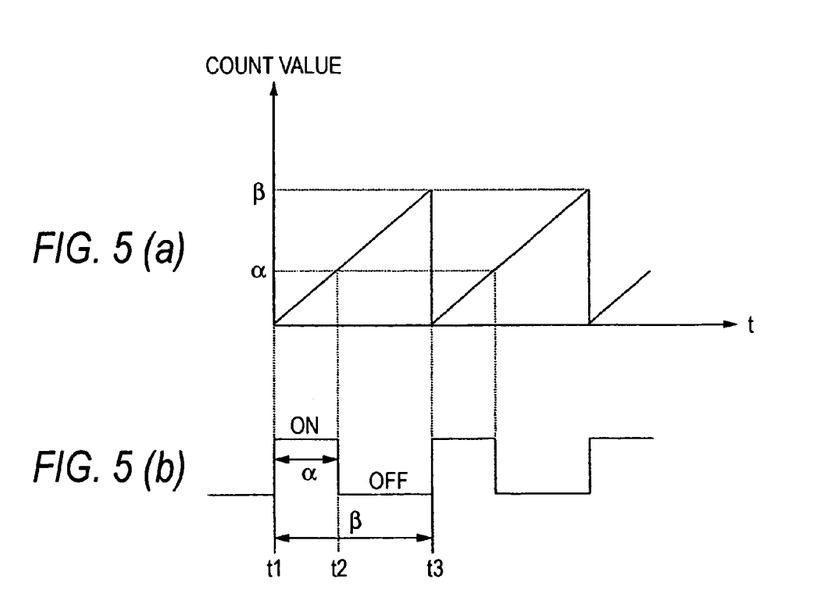
FIG. 5 is a waveform diagram explaining a compare-matching process in a microcomputer.

In setting the ON-duty of the switching signal, a first timer counter (not shown) for shifting a level of the switching signal from "1" to "0" when its count value reaches a set value α and a second timer counter (not shown) for shifting a level of the switching signal from "0" to "1" when its count value reaches a set value β, as shown in FIG. 5, for example, may be provided to the micro 18 as timer counters. A process is started at time t1 to count the clock. When the count value eaches the set value α at a time t2 to attain the compare matching, the first timer is reset and also the level of the switching signal is shifted from "1" to "0". Then, when the count value reaches the set value β at a time t3, the second timer is reset and also the level of the switching signal is shifted from "0" to "1". Then, the counting of the clock is started again at a time t3. A time period between the time t1 and the time t2 is set as the ON duty. The set value α of the first timer counter is decreased when the ON duty is to be decreased, and thus the ON duty can be decreased. The set value α is increased when the ON duty is to be increased, and thus the ON duty can be increased.

In the present embodiment, when the input voltage of the switching regulator 12 is increased suddenly and the interrupt request signal IRQ is provided from the input voltage sensing circuit 16, the micro 18 does not execute the arithmetic process to sense the change of the input voltage of the switching regulator 12, and reduces the ON duty of the switching signal so that it is shorter than the preceding ON duty in response to the interrupt request signal IRQ. Thus, an increase of a peak value of the current flowing through the primary side of the switching regulator 12 can be limited or blocked promptly. Therefore, the circuit elements constituting the switching regulator 12, and the like can be protected without fail.

Figure 6:
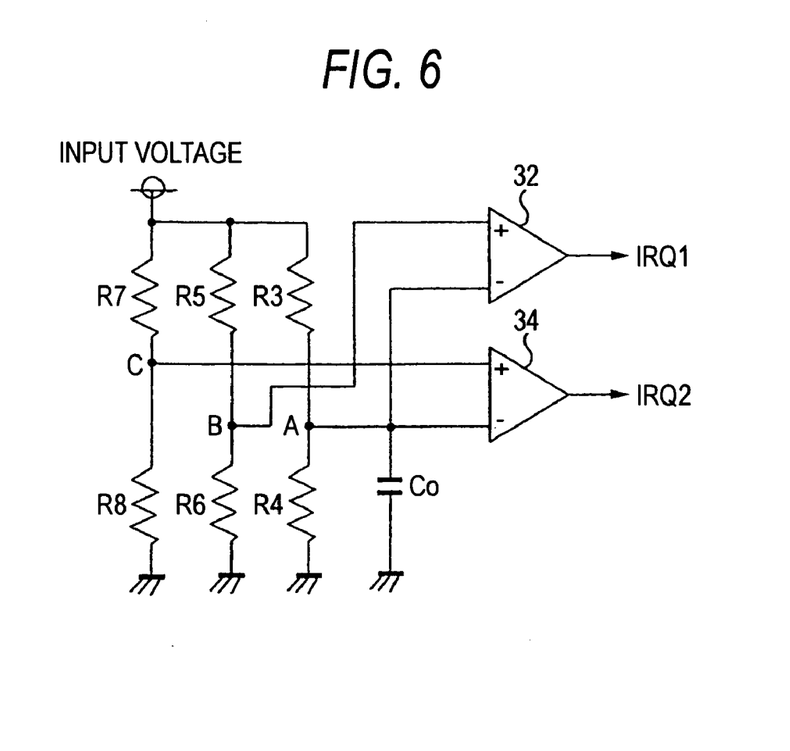
FIG. 6 is a circuit configuration showing another embodiment of the input voltage sensing circuit.
Figure 7:
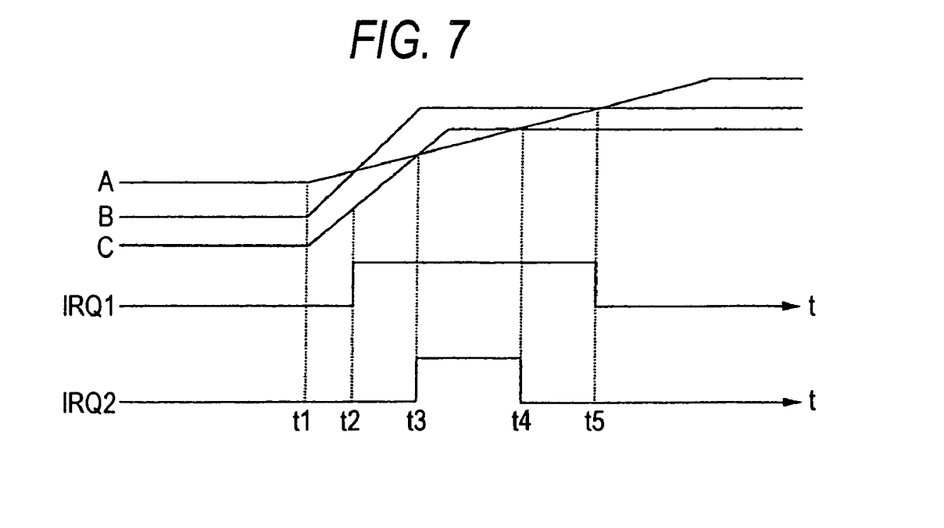
FIG. 7 is a waveform diagram explaining an operation of the input voltage sensing circuit shown in FIG. 6.

As shown in FIG. 6, comparators 32, 34, as well as resistors R7, R8 may be provided for the input voltage sensing circuit. The resistors R7, R8 serve as an auxiliary voltage-dividing means. The resistors R7, R8 divide the input voltage of the switching regulator 12, and provide a divided voltage obtained by this voltage division (divided voltage at a voltage-dividing point C) to a positive input terminal of the comparator 34. The reference voltage at the voltage-dividing point A is applied to a negative input terminal of the comparator 34. The divided voltages at respective voltage-dividing points A, B, C are set to satisfy a relationship as shown in FIG. 7: the divided voltage at a voltage-dividing point A> the divided voltage at a voltage-dividing point B> the divided voltage at a voltage-dividing point C. When the input voltage of the switching regulator 12 is out of a set voltage (set value) at a time t1, an interrupt request signal IRQ1 is provided from the comparator 32 as the input-voltage sudden-change sense signal at a time t2, and then an interrupt request signal IRQ2 is provided from the comparator 34 as the input-voltage sudden-change sense signal at a time t3. The interrupt request signal IRQ1 is provided to the external interrupt terminal 30, and the interrupt request signal IRQ2 is provided to other external interrupt terminal (not shown). At this time, the micro 18 executes a process in response to the interrupt request signal IRQ1 to reduce the ON duty of the switching signal so that it is shorter than that set before the input voltage of the switching regulator 12 is changed suddenly, and also executes a process in response to the interrupt request signal IRQ2 to reduce further the ON duty of the switching signal.

In this manner, the micro 18 executes the process of reducing sequentially the ON duty of the switching signal when the input voltage of the switching regulator 12 is changed suddenly. As a result, an increase of a peak value of the current flowing through the primary side of the switching regulator 12 can be limited smoothly, and also the circuit elements of the switching regulator 12 can be better protected.

In the foregoing embodiment of the switching regulator 12, the transformer T1 and the switch SW1 are provided and the output block 14 is connected to the secondary side of the transformer T1. However, the present invention also can be applied to other switching regulators. Examples of other embodiments are explained below.

Figure 8:
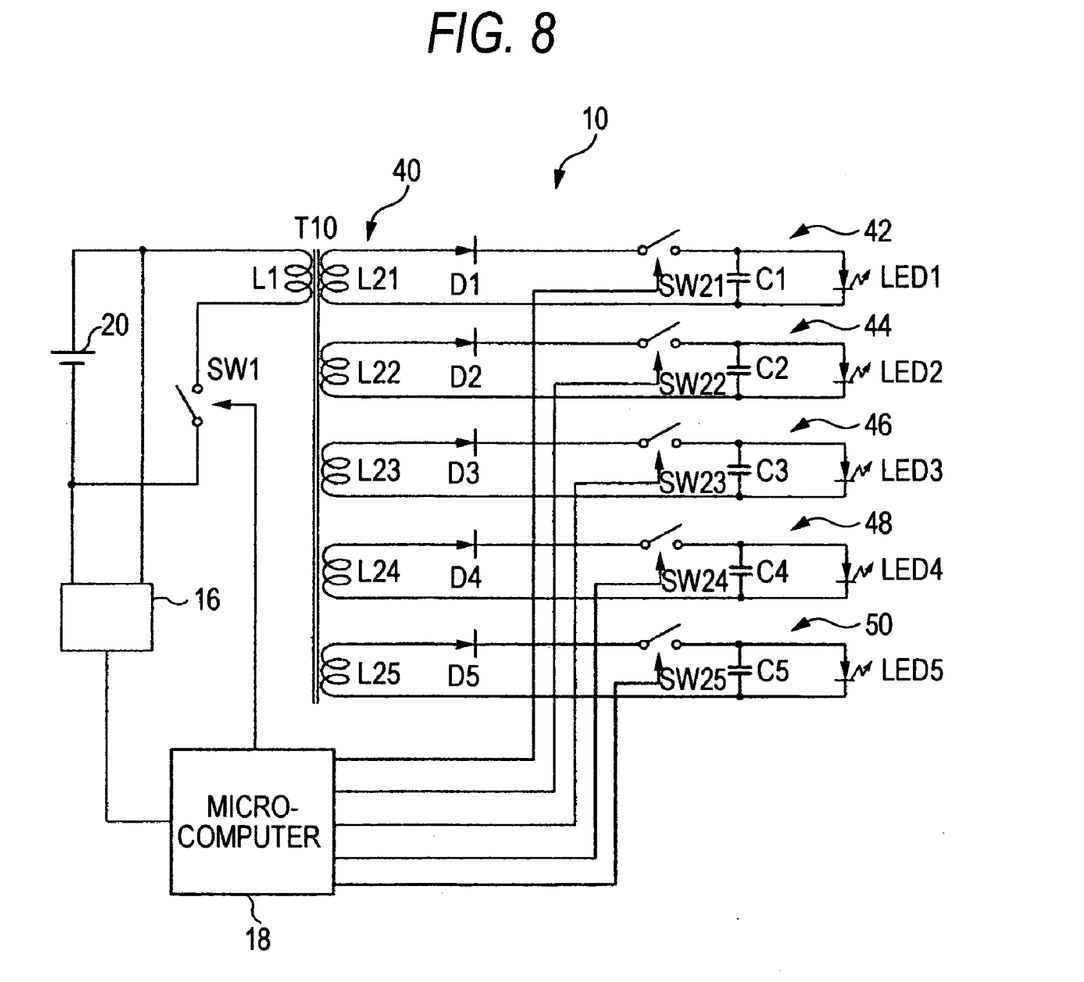
FIG. 8 is a circuit configuration showing an embodiment obtained when a switching regulator in a time-sharing system is employed.

An embodiment using a switching regulator 40 in a time-sharing system is shown in FIG. 8. The switching regulator 40 has a transformer T10 in place of the transformer T1. The switch SW1 is connected to the primary winding L1 of the transformer T10, and output blocks 42, 44, 46, 48, 50 are connected to secondary windings L21, L22, L23, L24, L25 respectively. Light emitting diodes LED1, LED2, LED3, LED4, LED5 are connected to the output blocks 42 to 50, respectively. The output blocks 42 to 50 have diodes D1, D2, D3, D4, D5, capacitors C1, C2, C3, C4, C5, and switches SW21, SW22, SW23, SW24, SW25y. In this case, the micro 18 generates the switching signals to control the ON/OFF-operation of the switch SW1 and also ON/OFF-control the switches SW21 to SW25 sequentially.

For example, in controlling the operations of respective switches in the current boundary mode, the input voltage from the onboard battery 20 is accumulated in the primary winding L1 as electromagnetic energy by turning ON the switch SW1, and then the accumulated electromagnetic energy is discharged to any of the output blocks 42 to 50 during the OFF-operation of the switch SW1. In other words, when the switch SW1 is turned OFF, only one of the switches SW21 to SW25 is turned ON, and the electromagnetic energy is supplied in a rectified mode to one of the light emitting diodes, LED1 to LED5, as luminous energy.

When the input voltage of the switching regulator 40 is changed suddenly, the micro 18 executes a control in response to the interrupt request signal IRQ to reduce the ON duty of the switching signal providedto the switch SW1. Therefore, an increase of a peak value of the current flowing through the primary side of the switching regulator 40 can be limited, and also the circuit elements of the switching regulator 40 can be protected without fail.

Figure 9:
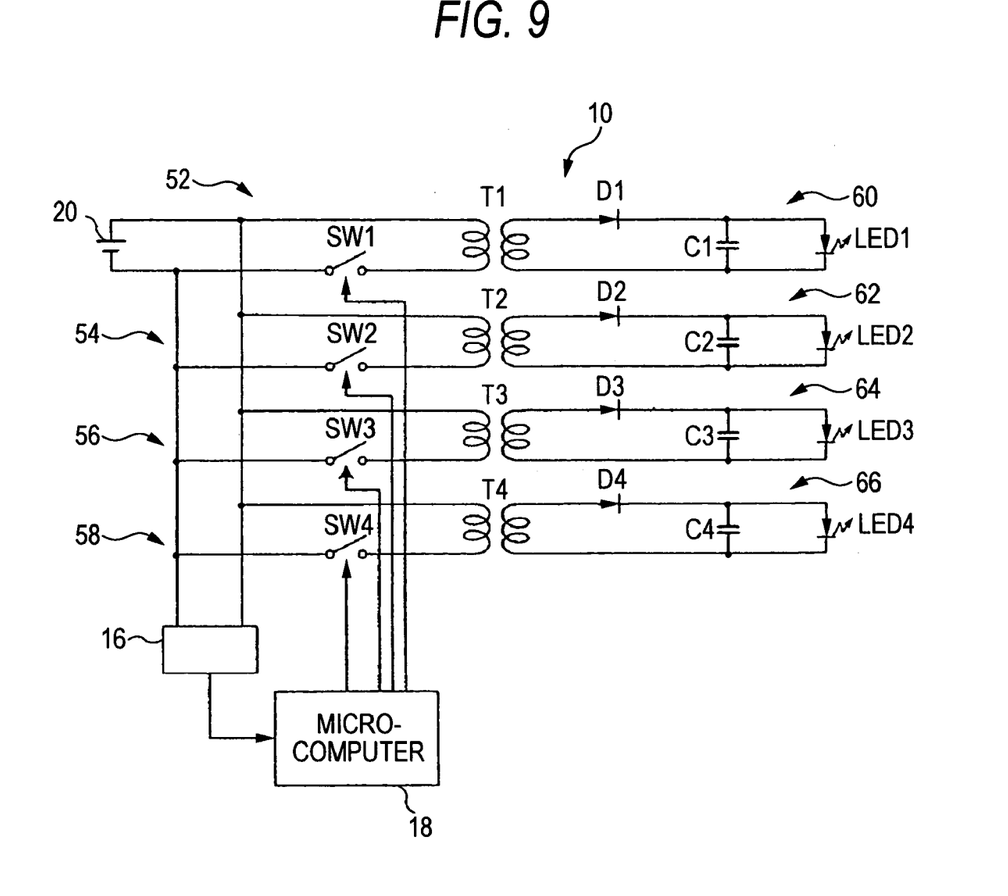
FIG. 9 is a circuit configuration showing an embodiment obtained when switching regulators in an independent system are employed.

FIG. 9 shown an independent system having switching regulators 52, 54, 56, 58. The switching regulators 52, 54, 56, 58 have transformers T1, T2, T3, T4, and switches SW1, SW2, SW3, SW4. Output blocks 60, 62, 64, 66 having diodes D1, D2, D3, D4 and capacitors C1, C2, C3, C4, respectively, are connected to secondary sides of the transformers T1 to T4. The light emitting diodes, LED1, LED2, LED3, LED4, are connected to the output blocks 60, 62, 64, 66, and serve as the semiconductor light source.

The micro 18 generates the switching signal provided to the switches SW1 to SW4 independently (individually), and then provides the generated switching signal to the switches SW1 to SW4. These switches SW1 to SW4 are turned ON/OFF in response to the switching signal (pulse signal) from the micro 18. The transformers T1 to T4 accumulate the input voltage from the onboard battery 20 in the primary windings as electromagnetic energy during the ON operation of the switches SW1 to SW4, and discharge the electromagnetic energy accumulated in the primary windings to the output blocks 60 to 66 from the secondary sides during the OFF operation of the switches SW1 to SW4. Then, when the input voltages of the switching regulators 52 to 58 are changed suddenly and thus the interrupt request signal IRQ is provided from the input voltage sensing circuit 16, the ON duty of the switches SW1 to SW4 is reduced in response to the interrupt request signal IRQ. Therefore, a peak value of the current flowing through the primary sides of the switching regulators 52 to 58 can be limited immediately, and also the switching regulators 52 to 58 can be better protected even when the input voltage is changed suddenly.

Figure 10:
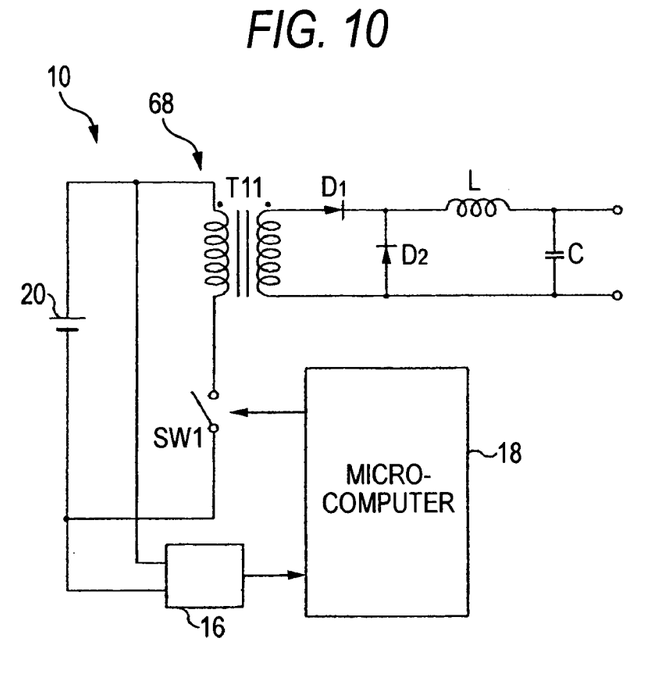
FIG. 10 is a circuit configuration showing an embodiment obtained when a switching regulator in a forward system is employed.

FIG. 10 shows of a forward system with a switching regulator 68. The switching regulator 68 has a transformer T11 and a switch SW1. The diodes D1, D2, a coil L, and a capacitor C are connected to the secondary side of the transformer T11.

When the switch SW1 is turned ON, the electromagnetic energy is accumulated in the transformer T11 and is discharged to the secondary side of the transformer T11. When the switch SW1 is turned OFF, the electromagnetic energy accumulated in the coil L is discharged to the load.

When the input voltage of the switching regulator 68 is changed suddenly and thus the interrupt request signal IRQ is provided from the input voltage sensing circuit 16, the micro 18 reduces the ON duty of the switching signal provided to the switch SW1. Therefore, an increase in the current flowing through the primary side of the switching regulator 68 can be limited.

Figure 11:
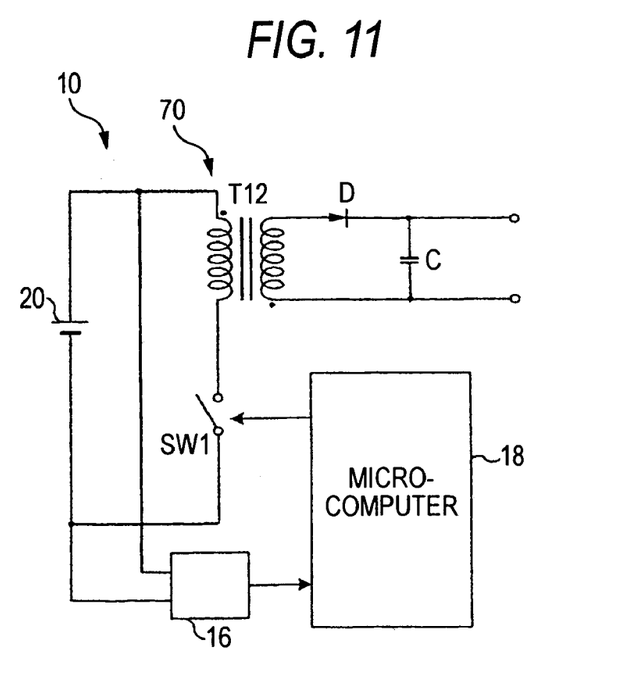
FIG. 11 is a circuit configuration showing an embodiment obtained when a switching regulator in a fly-back system is employed.

FIG. 11 shows a fly-back system with a switching regulator 70. The switching regulator 70 has a transformer T12 and a switch SW1. A diode D and the capacitor C are connected to the secondary side of the transformer T12.

When the switch SW1 is turned ON, the electromagnetic energy is accumulated in the transformer T12. When the switch SW1 is turned OFF, the electromagnetic energy accumulated in the transformer T12 is discharged to the load side.

When the input voltage of the switching regulator 70 is changed suddenly and thus the interrupt request signal IRQ is provided from the input voltage sensing circuit 16, the micro 18 reduces the ON duty of the switching signal provided to the switch SW1. Therefore, an increase in the current flowing through the primary side of the switching regulator 70 can be limited, and also the circuit elements of the switching regulator 70 can be protected without fail.

Figure 12:
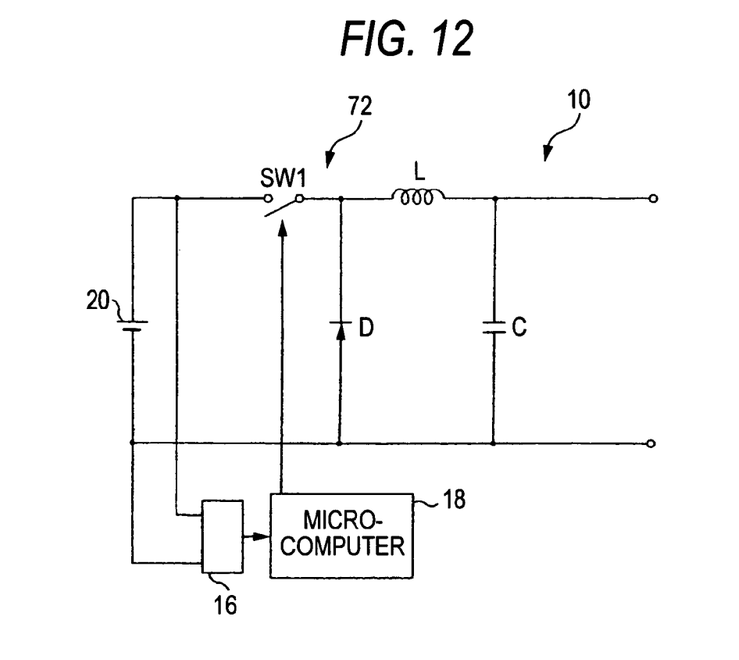
FIG. 12 is a circuit configuration showing an embodiment obtained when a step-down type switching regulator is employed.

FIG. 12 shows an embodiment with a step-down type switching regulator 72. The switching regulator 72 has a switch SW1, a diode D1, a coil L, and a capacitor C.

When the switch SW1 is turned ON, the input voltage is accumulated in the coil L as electromagnetic energy. When the switch SW1 is turned OFF, the diode D is conducted and then the electromagnetic energy accumulated in the coil L is discharged to the load side.

When the input voltage of the switching regulator 72 is changed suddenly and thus the interrupt request signal IRQ is provided from the input voltage sensing circuit 16, the micro 18 reduces the ON duty of the switching signal provided to the switch SW1. Therefore, an increase of a peak value of the current flowing through the coil L can be limited, and also the circuit elements of the switching regulator 72 can be better protected.

Figure 13:
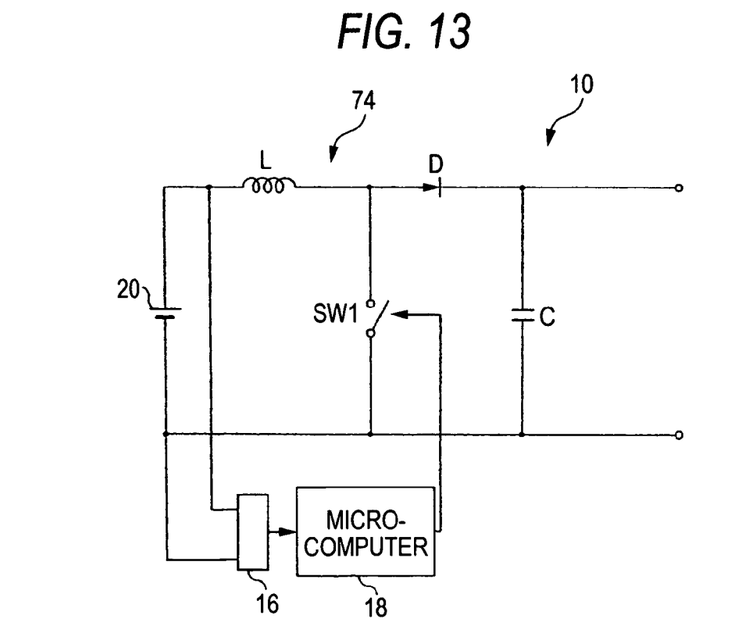
FIG. 13 is a circuit configuration showing an embodiment obtained when a step-up type switching regulator is employed.

FIG. 13 shows an embodiment with a step-up type switching regulator 74. The switching regulator 74 has a coil L, a switch SW1, a diode D1, and a capacitor C.

When the switch SW1 is turned ON, the input voltage is accumulated in the coil L as electromagnetic energy. When the switch SW1 is turned OFF, the electromagnetic energy accumulated in the coil L is discharged to the load side and superposed on the input voltage.

When the input voltage of the switching regulator 74 is changed suddenly and thus the interrupt request signal IRQ is provided from the input voltage sensing circuit 16, the micro 18 reduces the ON duty of the switching signal provided to the switch SW1. Therefore, an increase of a peak value of the current flowing through the coil L can be limited, and also the circuit elements of the switching regulator 74 can be better protected.

Other implementations are within the scope of the claims.

What is claimed is:

1. A lighting control circuit for a vehicle lighting device, comprising:
    a switching regulator for converting an input voltage from a power supply into an electromagnetic energy by an ON/OFF operation of a switching element connected to a transformer or a coil, and discharging the electromagnetic energy;
    an energy propagating means for propagating the electromagnetic energy discharged from the switching regulator to a semiconductor light source as luminous energy;
    a controlling means for generating a switching signal based on an arithmetic process, and controlling the ON/OFF operation of the switching element in accordance with the switching signal; and
    an input voltage sensing means for providing an input-voltage sudden-change sense signal to the controlling means when the input voltage sensing means senses that the input voltage of the switching regulator is out of a set voltage;
    wherein the controlling means is adapted to reduce an ON duty of the switching signal smaller than a preceding ON duty in response to the input-voltage sudden-change sense signal.

2. A lighting control circuit for a vehicle lighting device according to claim 1 wherein the input voltage sensing means includes:
    a plurality of voltage-dividing means for voltage-dividing the input voltage of the switching regulator at different voltage-dividing ratios,
    a charge accumulating means for accumulating a charge while using a divided voltage derived by a voltage division of a main voltage-dividing means, which has a highest voltage-dividing ratio out of the plurality of voltage-dividing means as a reference voltage that corresponds to the set voltage, and
    a comparing means for comparing the divided voltage derived by a voltage division of an auxiliary voltage-dividing means, which is different from the main voltage-dividing means out of the plurality of voltage-dividing means, with the reference voltage and then outputting the input-voltage sudden-change sense signal when the divided voltage derived by the voltage division of the auxiliary voltage-dividing means exceeds the reference voltage.

3. A lighting control circuit for a vehicle lighting device according to claim 1 wherein the input voltage sensing means includes:
    a plurality of voltage-dividing means for voltage-dividing the input voltage of the switching regulator at different voltage-dividing ratios,
    a charge accumulating means for accumulating a charge while using a divided voltage derived by a voltage division of a main voltage-dividing means, which has a highest voltage-dividing ratio, out of the plurality of voltage-dividing means as a reference voltage that corresponds to the set voltage, and
    a plurality of comparing means for comparing divided voltages derived by a voltage division of a plurality of auxiliary voltage-dividing means, which are different from the main voltage-dividing means out of the plurality of voltage-dividing means, with the reference voltage respectively and then outputting the input-voltage sudden-change sense signal when the divided voltages derived by the voltage division of respective auxiliary voltage-dividing means exceeds the reference voltage.

4. A lighting control circuit for a vehicle lighting device according to claim 1 wherein the controlling means includes a microcomputer that adapted to execute an arithmetic process in accordance with a program to generate the switching signal, and the microcomputer has an external interrupt terminal as an external signal input terminal, and the microcomputer is adapted to execute a process of reducing an ON duty of the switching signal as an external interrupting process when the input-voltage sudden-change sense signal is provided to the external interrupt terminal.

5. A lighting control circuit for a vehicle lighting device according to claim 3 wherein the controlling means includes a microcomputer adapted to execute an arithmetic process in accordance with a program to generate the switching signal, and the microcomputer has a plurality of external interrupt terminals as external signal input terminals, wherein the microcomputer is adapted to execute a process of reducing sequentially an ON duty of the switching signal as an external interrupting process each time when the input-voltage sudden-change sense signal is provided to respective external interrupt terminals.

6. A lighting control circuit for a vehicle lighting device according to claim 2 wherein the controlling means includes a microcomputer that adapted to execute an arithmetic process in accordance with a program to generate the switching signal, and the microcomputer has an external interrupt terminal as an external signal input terminal, and the microcomputer is adapted to execute a process of reducing an ON duty of the switching signal as an external interrupting process when the input-voltage sudden-change sense signal is provided to the external interrupt terminal.

* * * * *